US008118562B2

(12) United States Patent
Raes et al.

(10) Patent No.: US 8,118,562 B2
(45) Date of Patent: Feb. 21, 2012

(54) SACRIFICIAL BLADE TIP

(75) Inventors: Mark Raes, Andover, CT (US); David V. Arel, Richmond, VA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 444 days.

(21) Appl. No.: 12/380,704

(22) Filed: Mar. 3, 2009

(65) Prior Publication Data

US 2010/0226776 A1 Sep. 9, 2010

(51) Int. Cl.
*B63H 1/26* (2006.01)

(52) U.S. Cl. ...................................... 416/245 A; 440/37

(58) Field of Classification Search .................. 416/211, 416/245 A; 440/37
See application file for complete search history.

(56) References Cited

U.S. PATENT DOCUMENTS

| | | | | |
|---|---|---|---|---|
| 5,082,465 | A | | 1/1992 | Wine |
| 5,102,300 | A | | 4/1992 | Violette et al. |
| 5,782,607 | A | | 7/1998 | Smith et al. |
| 6,045,418 | A | | 4/2000 | Roos |
| 6,102,661 | A | * | 8/2000 | Robson et al. ................ 416/189 |
| 6,305,905 | B1 | | 10/2001 | Nagle et al. |
| 6,341,747 | B1 | | 1/2002 | Schmidt et al. |
| 7,048,510 | B2 | * | 5/2006 | Hedlund .................. 416/245 A |
| 7,260,973 | B1 | | 8/2007 | Peden |

* cited by examiner

*Primary Examiner* — Chandra Chaudhari
(74) *Attorney, Agent, or Firm* — Kinney & Lange, P.A.

(57) ABSTRACT

A propeller blade device used in environments where a propeller system is subjected to blade erosion and wear and may also be subjected to an axial force from water. The propeller blade includes a blade tip mounted on its outer end using a mounting device such as nuts and bolts to form a junction there between. The tip may easily be replaced when worn or damaged without removing the blade. The tip is designed to fracture upon impact with an axial force before transmitting the force radially inward to the propeller blade.

14 Claims, 5 Drawing Sheets

31
25
33
17

SACRIFICIAL BLADE TIP

BACKGROUND

The present invention relates to above deck propulsors for marine hovercraft applications. More particularly, the invention relates to a blade system that reduces the time and cost of repairing propeller blades damaged in use.

Hovercraft vehicles employ blowers for vehicle lift and a propeller and motor to drive forward. The blowers are directed downwardly on to sandy beaches at times, causing salt water and sand laden air to rise up into the propeller. Also, blade tip erosion due to airborne sand causes damage to the propeller blades, resulting in frequent repair and replacement of the blades.

A protective layer for the blade tips to protect them from erosion has not worked well because it is difficult to attach and tends to create an aerodynamic disruption in flow over the blade. Propeller blade tips are typically thin, leaving little room to hold fasteners.

A second problem in the use of above deck propulsors in marine hovercraft applications is known as the "green water" event. This occurs when a wave washes over the deck and is ingested by the propeller. This causes extensive damage to the propeller blades as well as to supporting structure.

Repair procedures for damaged propeller blades in these applications is costly and time consuming.

SUMMARY

A blade for use with marine hovercraft propulsor applications and other water craft using a propeller system including a blade having a thin sacrificial tip attached to the base blade assembly. The blade assembly has a base section that is thick enough to contain the fasteners that hold the tip on the blade. The tip is fastened so that the propeller operates as intended, but the tip can break off when subjected to forces that have, in the past, adversely affected the propellers. In the event of a "green water" event, the tip functions as a fuse, breaking away from the blade base to prevent or minimize transmission of extreme impact loads from the blade to the blade retention and propeller supporting structure. Because the tip is located on the outboard end of the propeller and it is thus subjected to the greatest amount of environmental wear. This arrangement minimizes damage to the rest of the propeller.

The blade and tip assembly allows for quick and inexpensive repair of damaged tips when the tip is attached to the blade in a manner that allows the tip to break off when subjected to an amount of stress that is less than that amount that would damage the blade or the blade retention and propeller supporting structure. Because the blade is a larger structure than the tip, a plurality of bolts are formed on the end of the blade that will have the tip attached. Corresponding bolt holes are formed on the end of the tip. The bolt holes may be threaded or may include a nut at the side of the hole facing away from the bolts. Other fastening devices may also be used. In all instances, the tip itself or the means fastening the tip to the blade allows the tip to break off outboard of it's bolted connection from the blade under a force less than would damage the blade.

DETAILED DESCRIPTION

Figure 1:
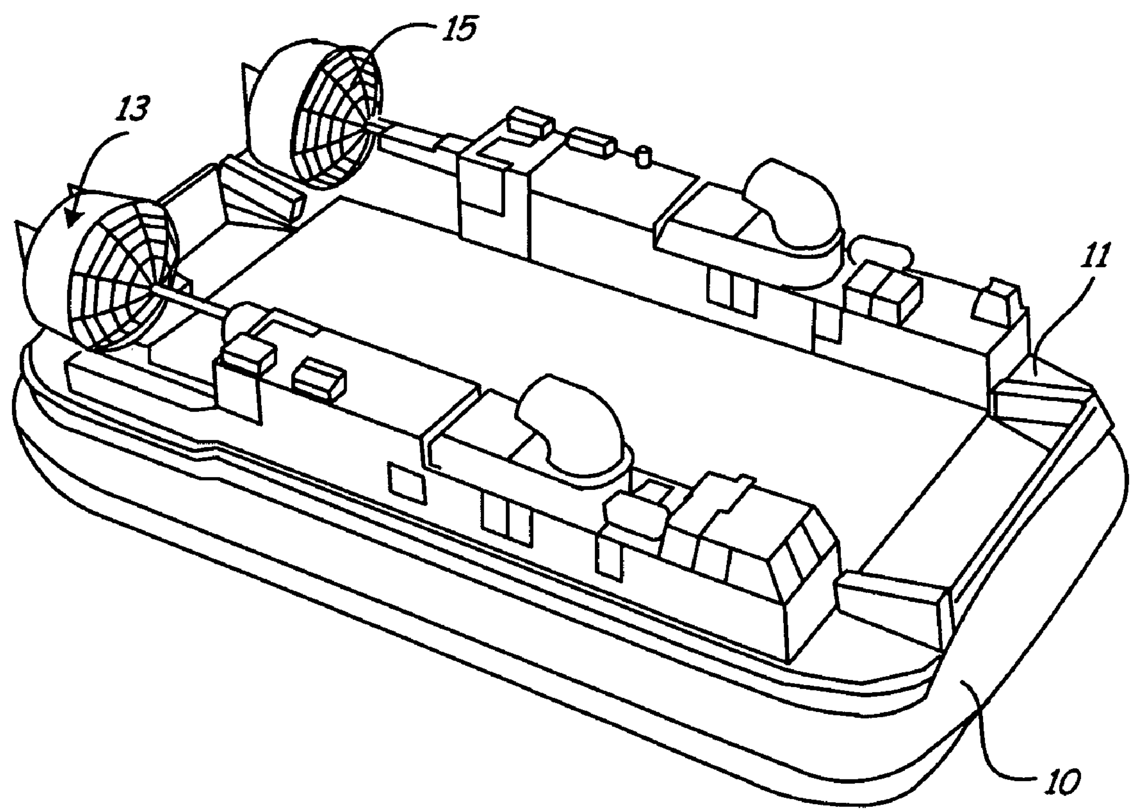
FIG. 1 is a perspective view of a hovercraft.

As seen in FIG. 1, a hovercraft 10 includes craft body 11 that has the lifting blowers and motors under the body, not shown, in a conventional manner. Hovercraft 10 also includes two propeller systems 13 and 15 that drive the hovercraft over water, beaches and other land surfaces. This particular hovercraft 10 is exemplary of the type of crafts where the propellers are subject to potential damage.

Figure 2:
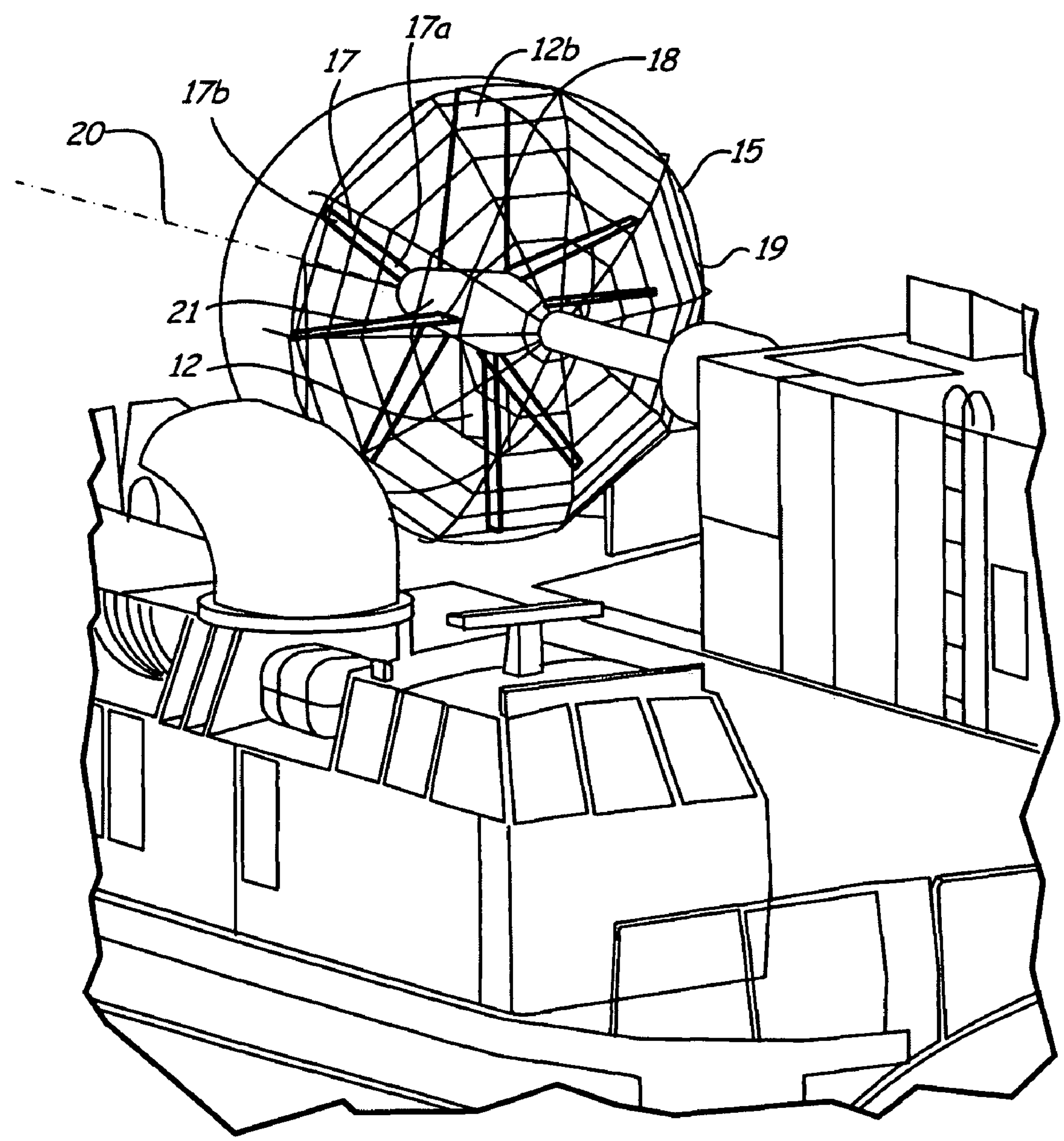
FIG. 2 is an enlarged view of a portion of the hovercraft in FIG. 1.

FIG. 2 shows an enlarged view of propeller system 15, with a plurality of propeller blades 17. The propellers 17 are in protective cage 19 that is necessarily open enough to function to propel the craft cage 19 is mounted via strut 18. It is clear that propellers 17 are exposed and can be subjected to debris such as sand, sand filled water, seaweed, and other flotsam and jetsam encountered in operating the crafts. The greatest force on propellers 17 is in the axial direction 20 of propeller hub 21. Propellers 17 have an inboard end **17*a* attached to propeller hub 21 and an outboard end 17*b*, which is more exposed to the environment, particularly in the direction of axial direction 20**.

Figure 3:
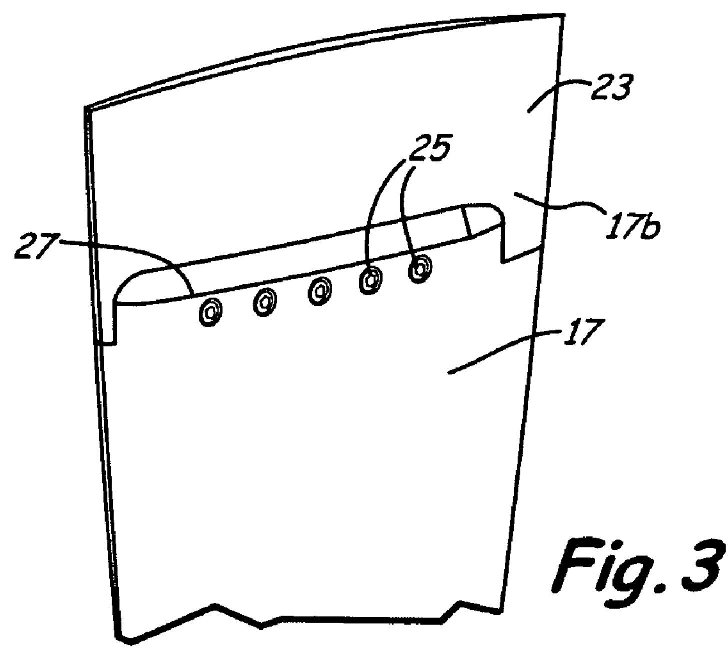
FIG. 3 is a view of a blade and tip for use on the propellers of the hovercraft of FIG. 1.

FIG. 3 is an enlarged view of one blade 17 that has been fitted with a blade tip 23, and has been attached by bolts 25 to form a junction 27 between blade 17 and tip 23. Other means to join tip 23 to blade 17 are also used. Examples of other means are tongue-in-groove assemblies, dovetail assemblies adhesives, screws, straps and bands. Junction 27 combines the strength of blade 17 in part and the strength of tip 23 in part, and is therefore stronger than tip 23 itself. While the relative lengths of blade 17 and tip 23 will depend on the specific propeller system, normally tip 23 will have a length of 10% to 40% of the length of blade 17.

In addition, tip 23 is not intended to be as strong as blade 17 in ability to resist a sudden increase in axial force such as a "green water" event where water washes into the cage 19 in the direction of axis 20. Generally, the blade load during operation of a hovercraft is about 2,500 pounds (1137 kg.) in air, based on a four blade system. More blades will reduce the load per blade. When water contacts a blade or set of blades, such as in a "green water" event, the load increases by a factor of 800 or more, which is enough to break the blade.

In order to have a reference for the direction that propeller 17 extends, tip 23 is located on the outboard side of junction 27 and the blade 17 is on the inboard side of junction 27. Inboard and outboard are terms used to describe the radial direction toward and away from axis 20.

In most situations, it is possible to locate the point on a propeller blade at which the most wear takes place. The length of blade 17 and tip 23 are designed so that the junction 27 is inboard of the region of greatest wear. Thus when the tip 23 is damaged or eroded, it can readily be replaced and a new tip 23 can be installed using ordinary tools and in a short period of time. It is no longer necessary to replace the entire propeller blade 17, thus saving time and money.

Propellers such as those used in hovercrafts are made from a wide variety of materials, and all of them are within the scope of this invention. Blade 17 and tip 23 may be made from composites of fiberglass, carbon, or aramid fibers, as well as combinations of these fibers. Also, plastics such as reinforced resins, thermoplastics may be used. Metals such as alloys of aluminum, steel, nickel or titanium and these metals hardened by heat treatments are also materials that are within the scope of this invention. It is also contemplated that the propellers, either blade 17 or tip 23 or both, may be coated with coatings providing high erosion and wear resistant properties. The use of ceramic coatings or of ceramic materials in the manufacture of the blade tip for erosion and wear resistance are also within the scope of this invention.

Figure 4:
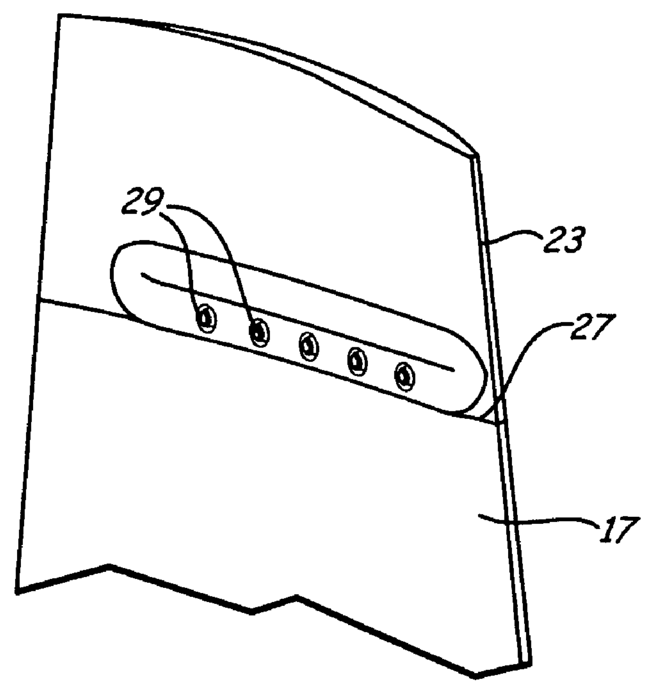
FIG. 4 is a view of the other side of the blade and tip of FIG. 3.

FIG. 4 illustrates the other side of the blade 17 and tip 23 of FIG. 3. Nuts 29 have been attached to bolts 25 at junction 27. As can be seen, it is a simple matter to disengage nuts 29 from bolts 25 to remove and replace tip 23. Again, other fastening means may be used with equal effectiveness because the function of the fastening means is to hold the blade 17 and tip 23 together. Under stress, the tip 17 will break at a point outboard of the junction 27.

Figure 5:
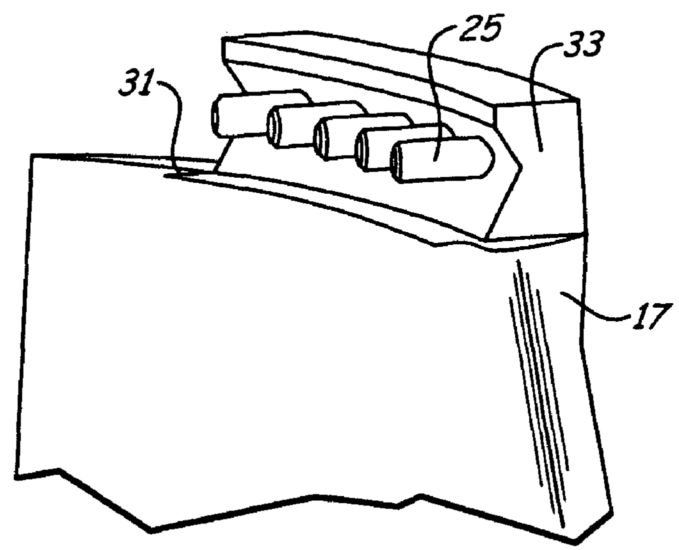
FIG. 5 is a view of the blade portion of the device in FIG. 3.
Figure 6:
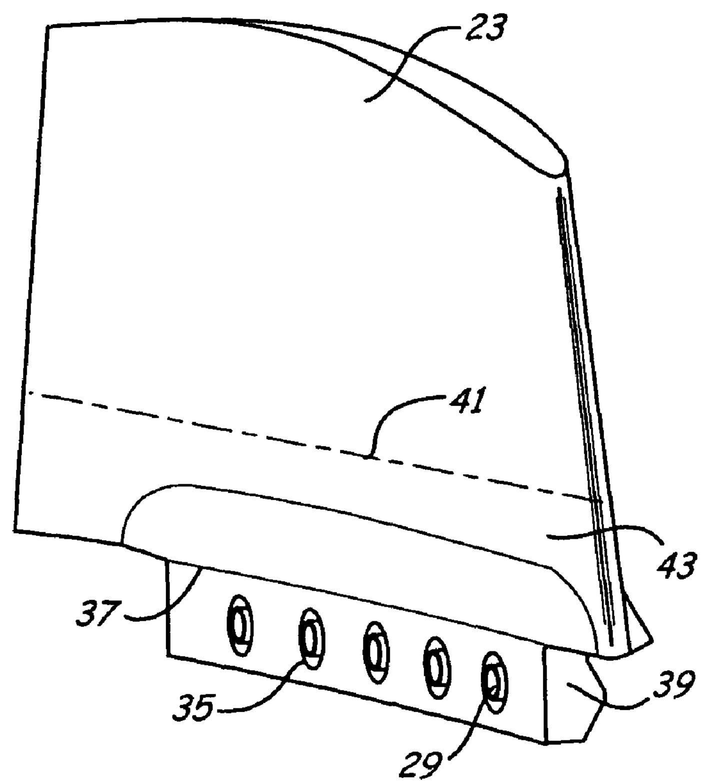
FIG. 6 is a view of the tip portion of the device in FIG. 3.

FIG. 5 illustrates blade 17 with bolts 25 before attachment of a tip. Blade 17 has a shelf 31 inboard of bolts 25. Shelf 31 is sized and shaped to allow a tip to nest on blade 17. The right angle shelf 31 makes with blade end 33 provides two surfaces for supporting the mating at junction 27. Similarly, FIG. 6 illustrates tip 23 with holes 35 that hold nuts 29. Tip 23 also has a shelf 37 that mates with tip end 39 to form a right angle.

Attachment of tip 23 to blade 17 provides for junction 27 that is stronger than tip 23. A sudden increase in axial bending force such as from the previously described "green water" event will cause tip 23 to break or bend outboard of junction 27.

While it is contemplated that tip 23 will be shaped to function aerodynamically as a propeller tip, means to further insure that tip 23 breaks before any damage to propeller blade 17 occurs can be provided. It is desirable that tip 23 fracture under sudden axial load prior to transmitting the load radially inboard to the blade. Effectively, the blade 17 and junction 27 have a higher flex strength in the axial direction 20 than at least a portion of tip 23. Tip 23 can have a score line 41 or a region 43 of tip 23 can be made thinner than the rest of tip 23. Use of either score line 41 or thin region 43, or both, is within the scope of this invention.

Figure 7:
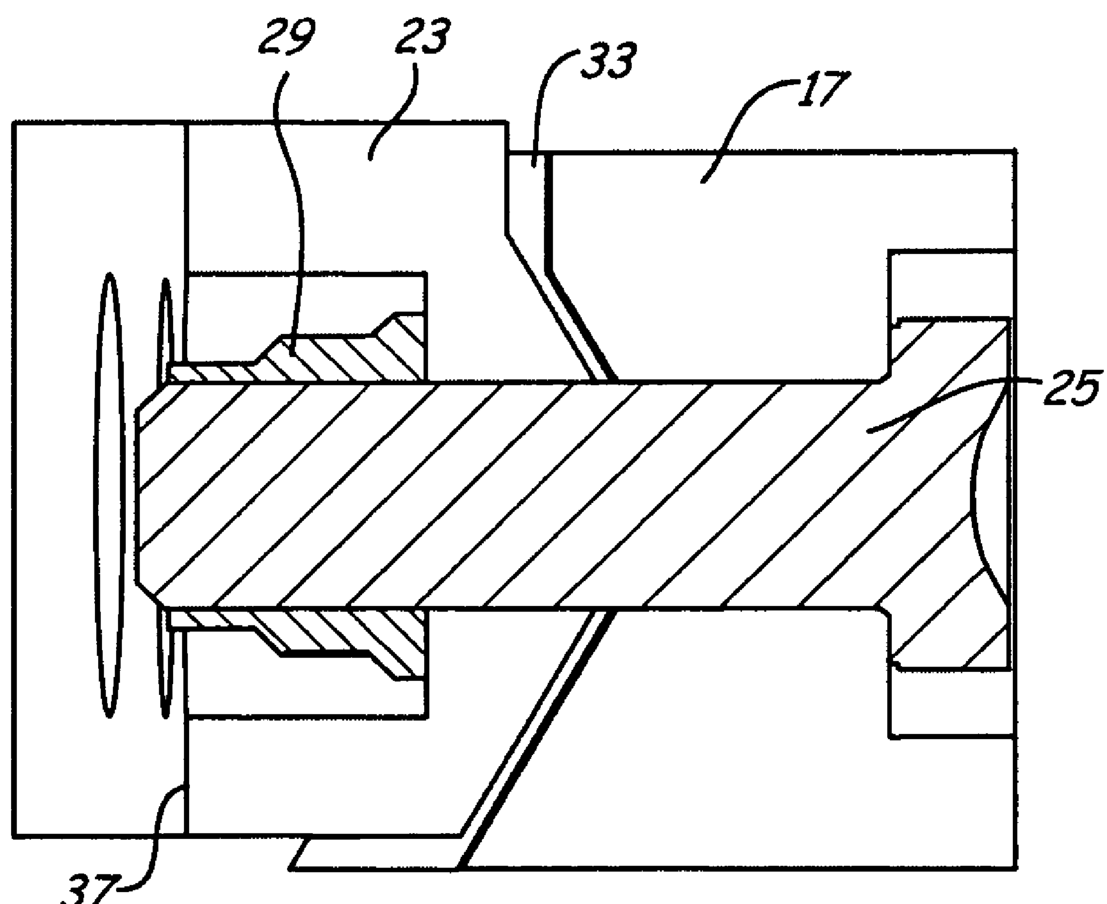
FIG. 7 is an enlarged sectional view of the attachment region of the blade and tip of FIG. 3.

FIG. 7 is a cross section of the assembly with tip 23 attached to blade 17 via bolt 25 and nut 29.

In operation, the hovercraft functions in a normal manner, encountering the environment such that the tips of the propellers incur the greatest wear and, should it be necessary, the tips will break or bend before any damage is done to the rest of the propeller or to the mounting assembly including the propeller hub.

Although the present invention has been described with reference to preferred embodiments, workers skilled in the art will recognize that changes may be made in form and detail without departing from the spirit and scope of the invention.

The invention claimed is:

1. A propeller for use in environments where a propeller is subjected to blade erosion and wear, the propeller comprising:
- a propeller blade having an inner end for mounting on a hub in a propeller system and an outer end;
- a propeller blade tip having an end for mounting on the propeller blade; and
- a mount for mounting the blade tip on the propeller blade outer end to form a junction of the blade and the tip, wherein the blade and junction have a higher flex strength in the axial direction than the tip and wherein the tip includes a region outboard of the junction having lower flex strength in the axial direction than the remaining portion of the tip.

2. The device of claim 1, wherein the junction is located inboard of the primary blade erosion and wear area of the device.

3. The device of claim 1, wherein the tip will fracture under sudden increased axial load prior to transmitting the load radially inboard to the blade.

4. The device of claim 1, wherein the region is formed by a score line.

5. The device of claim 1, wherein the region is axially thinner than the remaining portion of the tip.

6. A propeller for use in environments where a propeller is subjected to blade erosion and wear, the propeller comprising:
- a propeller blade having inner end hub mounting means for mounting the blade on a hub in a propeller system and an outer end;
- a propeller blade tip having end means for mounting on the propeller blade; and
- mounting means for mounting the blade tip end means on the propeller blade outer end to form a junction of the blade and the tip, wherein the blade and junction have a higher flex strength in the axial direction than the tip and wherein the tip includes a region outboard of the junction having lower flex strength in the axial direction than the remaining portion of the tip.

7. The device of claim 6, wherein the junction is located inboard of the primary blade erosion and wear area of the device.

8. The device of claim 7, wherein the tip will fracture under axial load prior to transmitting the load radially inboard to the blade.

9. The device of claim 6, wherein the region is formed by a score line.

10. The device of claim 6, wherein the region is axially thinner than the remaining portion of the tip.

11. A method of protecting a propeller blade in environments where a propeller system is subjected to blade erosion and wear, comprising the steps of:
- mounting a propeller blade having inner end for mounting on a hub in a propeller system and an outer end; and
- mounting a propeller blade tip on the blade outer end to form a junction of the blade and the tip, wherein the blade and junction have a higher flex strength in the axial direction than the tip and wherein the tip includes a region outboard of the junction having lower flex strength in the axial direction than the remaining portion of the tip.

12. The method of claim 11, wherein the junction is located inboard of the primary blade erosion and wear area of the propeller system.

13. The method of claim 11, wherein the tip will fracture under axial load prior to transmitting the load radially inboard to the blade.

14. The method of claim 11, wherein the region is formed by a method selected from at least one of the group consisting of forming a score line in the region and forming the region such that it is axially thinner than the remaining portion of the tip.

* * * * *